United States Patent Office 3,214,663
Patented Oct. 26, 1965

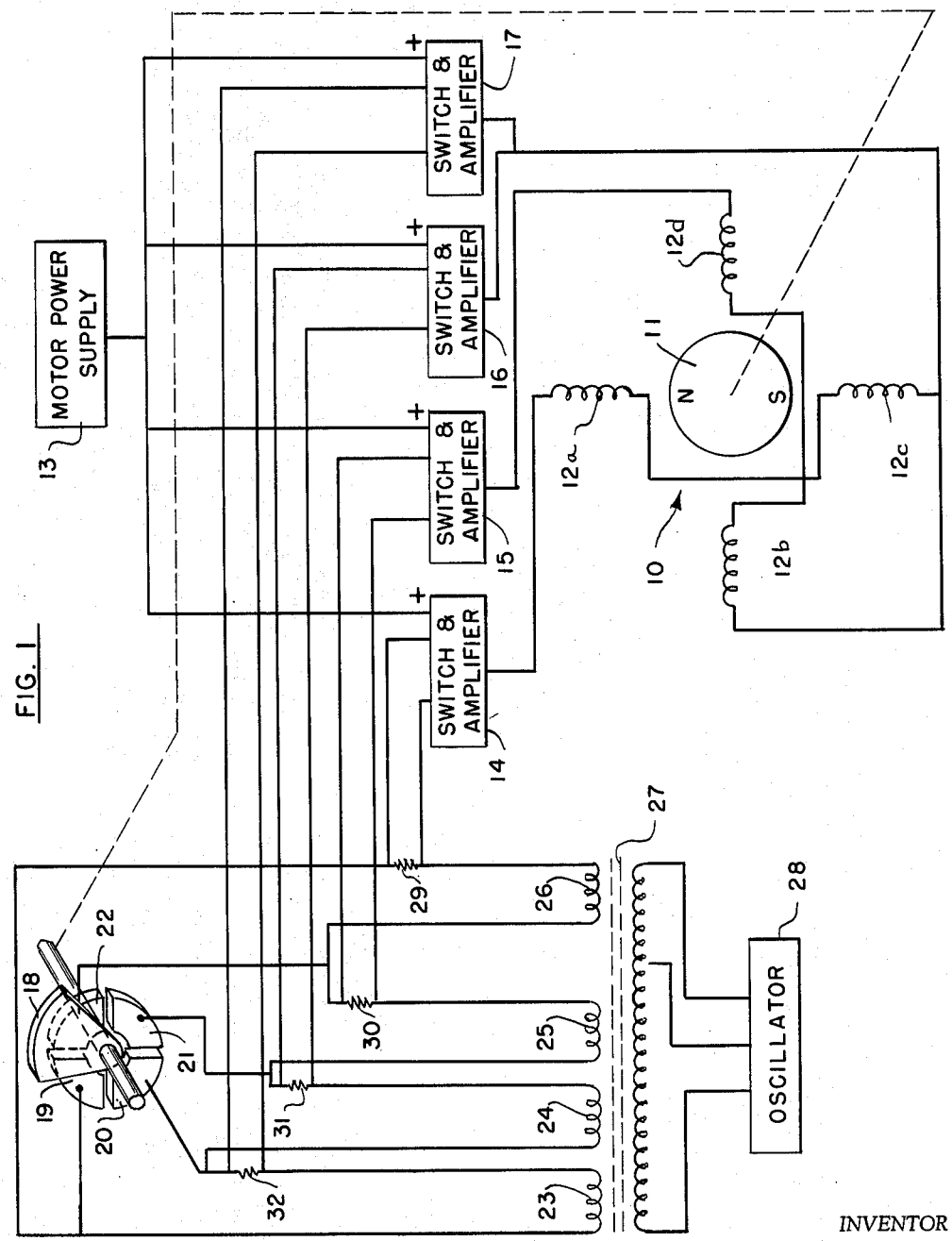

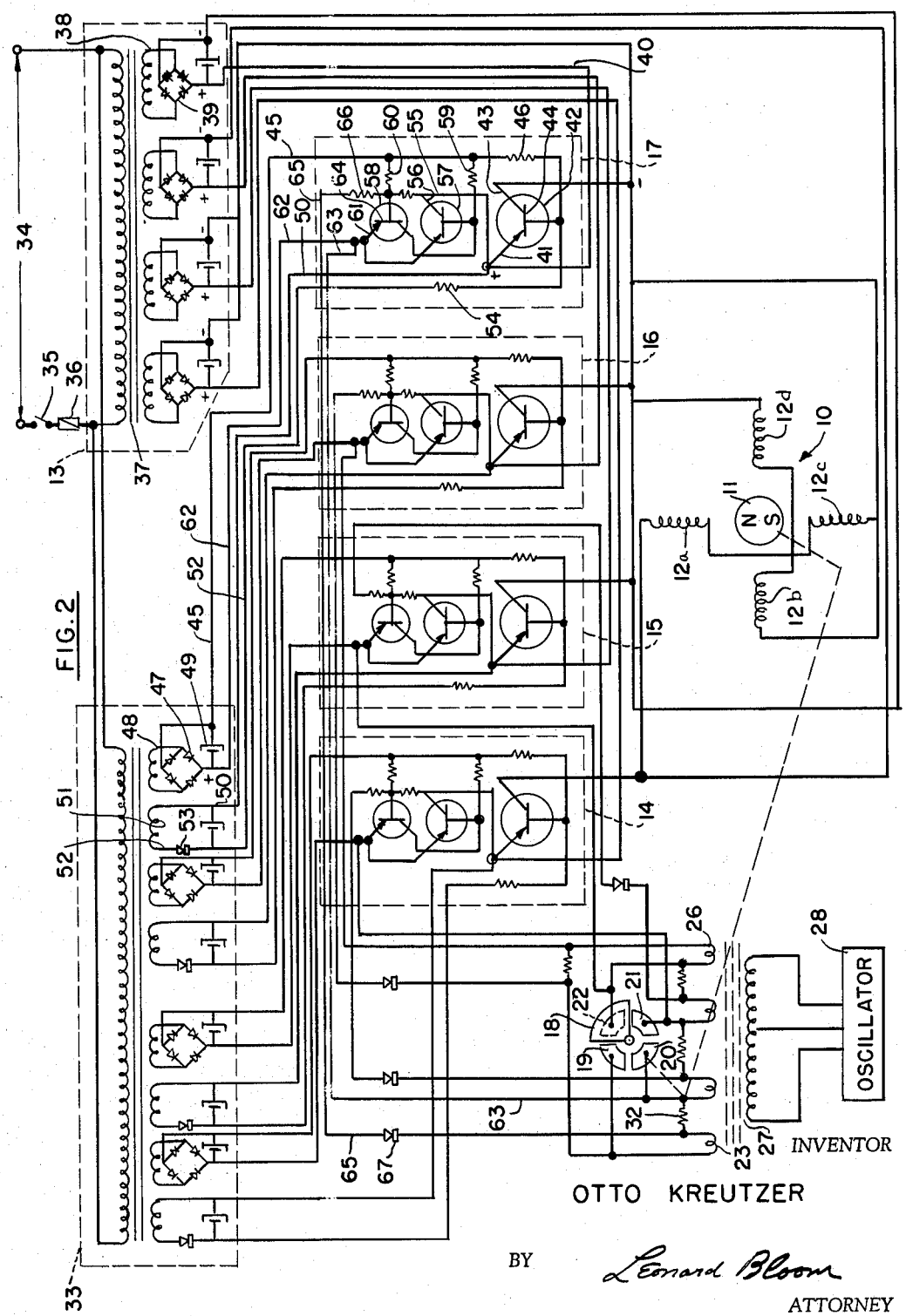

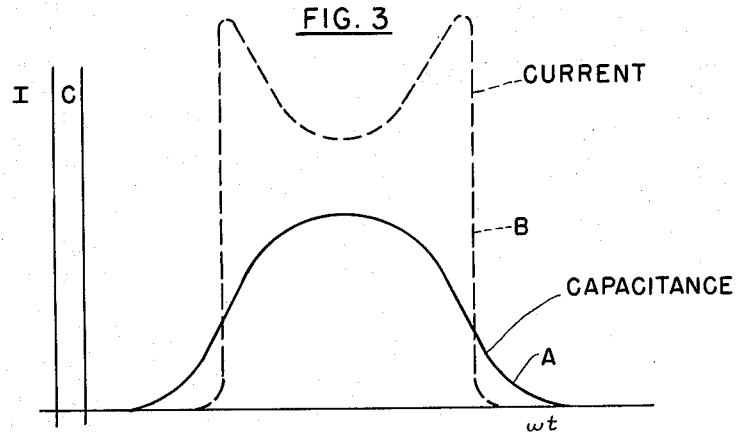
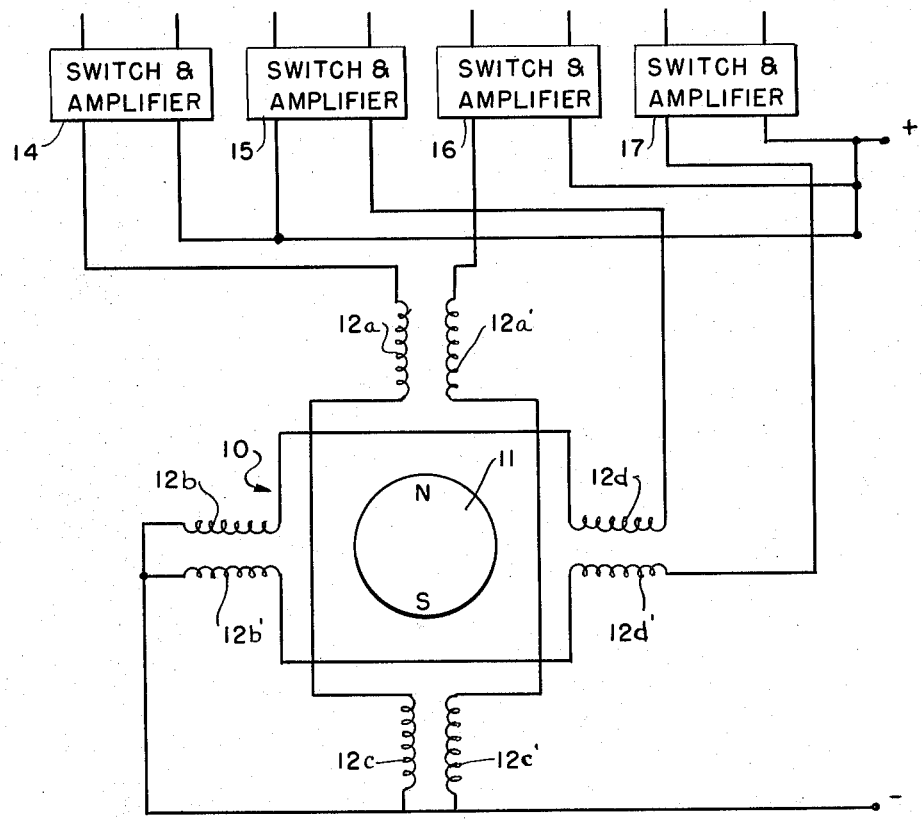

3,214,663
SEMICONDUCTOR COMMUTATED MOTOR SYSTEM WITH CAPACITIVE PICKUP
Otto Kreutzer, Konstanz, Germany, assignor to The Black and Decker Manufacturing Company, Towson, Md.
Filed Nov. 21, 1962, Ser. No. 239,208
4 Claims. (Cl. 318—138)

The present invention relates to brushless or "contactless" commutation of rotating electrical apparatus, and more particularly, to that improvement in brushless commutation which includes a capacitive coupling between the rotor and the stator.

In the prior art of which I am aware, electrical motors, which include a stator and a rotor, have long been utilized to convert an available electrical energy into the useful mechanical energy represented by the rotation of the rotor. Part of the electrical energy is used to create a stationary magnetic field, while the remainder of the electrical energy is used to create a rotating magnetic field; and the magnetic interaction between these fields, one stationary and the other rotating, results in the rotation of the rotor. The rotor usually has the rotating magnetic field established in it; and in the conventional series-wound or shunt-wound motors, the rotor usually takes the form of a laminated armature having a series of coils wound thereon. With such motors, electro-mechanical commutation means are provided, not only to carry the current to the respective armature coils, but also, to reverse the direction of current flow in successive coils. This electro-mechanical commutation means generally comprises a pair of carbon or graphitic brushes which ride upon a segmental commutator, the latter usually having a cylindrical or disc-like configuration.

Moreover, the prior art has also taught the use of inverted motor configurations, wherein the stationary magnetic field is established in the rotor and the rotating magnetic field is established in the stator; and in conjunction with such inverted motor configurations, various static switching means have been developed in the prior art to establish a rotating magnetic field in the stator in timed relationship to the position of the rotor, the means employed generally being in the nature of a "feed back loop" between the stator and the rotor. Such static switching means are purely electrical or electronic in nature, being generally referred to as "brushless commutation," and are usually developed along one of the following prior art methods:

One, a series of stator pick-up coils may be utilized, each of which has control voltages induced therein, in sequence, by means of a special magnetic signal generating wheel that is in turn coupled to the rotor shaft for rotation in unison; and the control voltages induced in the pick-up coils are then utilized to activate semiconductor switches, so as to establish a rotating field in the stator and simultaneously to synchronize the energization of the stator coils with the rotation of the rotor. However, this prior art method is unsatisfactory inasmuch as it is not self-starting, there being no control voltages or switching signals in the stopped or zero r.p.m. position of the machine; morever, the magnitude of the control voltages induced in the stator pick-up coils depends to an appreciable extent upon the speed of the machine, and hence, the design of the switching circuitry becomes unduly complicated.

Secondly, and in lieu of the stator pick-up coils, the prior art has also resorted to Hall-effect generators, or similar types of semi-conductors, which generate control voltages based upon magnetic effects, the special magnetic-signal generating wheel still being utilized. However, this prior art method, like the stator pick-up coils described above, is also disadvantageous inasmuch as it uses the signal generating wheel; and this wheel, being made of a permanent magnet, will experience certain "aging" effects which necessitate a repeated adjustment in the circuitry. Moreover, the Hall-effect generators are expensive, they are temperature sensitive, and the waveform and magnitude of the control voltages that are generated are such as to necessitate a complicated, and hence expensive, circuitry for their subsequent reshaping and amplification.

Thirdly, a still further prior art method utilizes photocells, or light-sensitive transistors, in conjunction with a rotating light beam and associated circuitry. However, this prior art method is also disadvantageous because the brightness of the light beam depends upon voltage and upon the life duration of the light supply; because the photo-cells or light-sensitive transistors are, to a certain degree, temperature sensitive; because the associated switching and amplification circuitry becomes unduly complex and hence expensive; and because a relatively-large physical space is required, thereby rendering the construction of miniature motors generally impractical.

Accordingly, it is the basic object of the present invention to alleviate all of the aforementioned deficiencies in the prior art by providing an improvement in brushless commutation which comprises a capacitive coupling between the stator and the rotor.

Broadly stated, and in accordance with the general teachings of the present invention, there is disclosed herein a rotating electrical apparatus which comprises a rotor having a stationary magnetic field, a stator surrounding the rotor and having a rotating magnetic field to interact with the stationary magnetic field, and a capacitive coupling between the rotor and the stator so as to control the establishment of the rotating magnetic field in the stator and synchronize it with respect to the rotation of the rotor.

More specifically, and in accordance with a preferred embodiment of the present invention, there is disclosed herein an inverted direct-current electrical motor, utilizing brushless commutation, and comprising a rotor and a stator, the rotor preferably being formed as a permanent magnet, and the stator including a plurality of stator coils which surround the rotor. The stator coils are energized by suitable power supply means; and switching means is provided, intermediate the power supply means and the stator, so as to control the sequential energization of the stator coils. This switching means comprises a plurality of stationary electrodes, corresponding to the plurality of stator coils, and a rotating electrode, mechanically coupled to the rotor, and rotating in close proximity to the stationary electrodes. Means including a high-frequency oscillator are utilized to energize the stationary electrodes; and adjacent pairs of the stationary electrodes are part of a plurality of tuned resonant circuits, one for each of the stator coils. Each of these tuned circuits exhibit periodic changes in the capacitive coupling between the rotating electrode and a respective pair of stationary electrodes; and means are then provided to utilize this capacitive coupling effect between the rotating electrode and successive pairs of stationary electrodes, in sequence with each other, so as to control the switching means for the stator coils, thereby synchronizing the sequential energization of the stator coils with the rotation of the rotor.

These and other objects of the present invention will become apparent from a reading of the following specification taken in conjunction with the enclosed drawings in which:

FIGURE 1 is a general schematic diagram of the apparatus of the present invention;

FIGURE 2 is a more specific schematic diagram showing a preferred embodiment constructed in accordance with the teachings of the present invention;

FIGURE 3 is a curve illustrating the degree of capacitive coupling between the rotor and stator, and further illustrating the periodic resonances that are produced at certain predetermined values of capacitance; and FIGURE 4 shows a modified arrangement of winding the plurality of stator coils.

With reference to FIGURE 1, there is illustrated an inverted direct-current electrical motor 10 with which the teachings of the present invention may find more particular utility. The motor 10 comprises a permanent magnet rotor 11 and a stator which includes a plurality of stator coils 12a, 12b, 12c, and 12d that surround the rotor 11. Motor power supply means, designated generally as at 13, energizes the stator coils 12a–12d through suitable "switches and amplifiers," designated as 14, 15, 16, and 17, respectively, with the return path from the stator coils 12a–12d being omitted in FIGURE 1 for ease of illustration. The rotor 11 is mechanically coupled (as denoted by the broken lines) to a rotating electrode 18 which rotates in close proximity to a plurality of stationary electrodes 19, 20, 21, and 22, each of which is generally formed as a quadrant; and these stationary electrodes 19–22 correspond, respectively, to the plurality of stator coils 12a–12d. Respective pairs of the stationary electrodes 19–22 are energized from the secondary coils 23, 24, 25, and 26 of a transformer 27, the primary of which is energized by means of a suitable high-frequency oscillator 28. The secondary coils 23–26 are connected in opposite position, so that the voltages of two consecutive windings cancel each other.

With reference again to FIGURE 1, and with further reference to FIGURE 3, an adjacent pair of stationary electrodes, say 19 and 22, are connected in series with the secondary coil 26 of the transformer 27; and this particular circuit, like the others associated with the remaining secondary coils 23–25, comprises in effect a tuned circuit that will exhibit periodic resonance effects at certain predetermined values of capacitive coupling between the rotating electrode 18 and the pair of stationary electrodes 19, 22. In FIGURE 3, the solid curve A represents the degree of capacitance between the stationary electrodes 19, 22 under the influence of the continuously rotating electrode 18, and this capacitance reaches a maximum whenever the rotating electrode 18 is symmetrically disposed with respect to the stationary electrodes 19, 22 so as to overlap equal portions, approximately as shown in FIGURE 1. The parameters of capacitance and inductance are chosen, however, so that each tuned circuit goes through two resonances per revolution of the rotating electrode 18, as indicated by the (broken) current curve B in FIGURE 3; and these resonance points occur at certain circumferential positions of the rotating electrode 18, that is to say, previous to (and then subsequent to) the circumferential position of maximum capacitance. This maximum capacitive coupling effect preferably generates a control voltage, sometimes referred to as a "gate" signal, which may be taken from the resistor 29 and utilized to control its respective switch and amplifier 14 for the energization of the respective stator coils 12a and 12c. Each of the other secondary coils 23, 24 and 25 of the autotransformer 27 are likewise in a respective tuned circuit that includes adjacent pairs of the stationary electrodes 19–22, and the control voltages derived therefrom are taken from the respective resistors 30, 31, and 32 so as to energize, in sequence, the respective switches and amplifiers 15, 16, and 17. Consequently, the stator coils 12a–12d are energized through the respective switches and amplifiers 14–17, in sequence and preferably in accordance with the capacitive effects in the resonant tuned circuits, that is, the degree of capacitive coupling exerted by the rotating electrode 18 on a pair of adjacent stationary electrodes 19–22. This synchronizes the sequential energization of the stator coils in accordance with the rotation of the rotor 11; and the interaction between the rotational magnetic field established in the stator, and the stationary magnetic field established in the rotor, generates the rotation of the rotor 11.

With the motor circuit illustrated in FIGURE 1, the four switches and amplifiers 14–17 are connected so that current may flow in both directions in the stator coils 12a–12d; and as a result, maximum efficiency may be realized from a given motor size.

With reference to FIGURE 2, there is illustrated the more specific circuitry of a preferred embodiment constructed in accordance with the teachings of the present invention. The motor 10 comprises a rotor 11 and a plurality of stator coils 12a–12d. The rotor 11 is again illustrated as being of the permanent magnetic type, although it will be appreciated that other means of establishing a stationary magnetic field in the rotor 11, such as windings and slip rings, are also feasible. The motor 10 is energized through the motor power supply 13, the preferred specific circuitry of which is enclosed by broken lines. The "switches and amplifiers" 14–17 control the sequential energization of the stator coils 12a–12d, respectively, and the preferred specific circuitry of the respective switches and amplifiers 14–17 is also enclosed in the broken lines. Moreover, the respective switches and amplifiers 14–17 are fed by a suitable supply, which is designated generally as at 33, and which also has its specific circuitry enclosed within broken lines. As previously noted, the switches and amplifiers 14–17 receive their control voltages or gate signals by reason of the capacitive coupling effects generated between the stationary electrodes 19–22, one each corresponding to a respective stator coil 12a–12d, and the rotating electrode 18 which is mechanically coupled to the rotor 11.

The motor power supply 13 is connected across a line 34 which, for example, may be 110 volts A.C. at 60 cycles; and a suitable switch 35 and fuse 36 are interposed between the line 34 and the supply 13. The individual supply circuitry, as well as the control circuitry, for each of the stator coils 12a–12d is identical; and hence only one circuit, that which is associated with switch and amplifier 17, will be described in detail. The supply 13 comprises a suitable transformer 37 having a plurality of secondary coils, one of which is designated as at 38. The secondary coil 38 of transformer 37 is connected to the input of a suitable full-wave rectifier 39, the output of which is connected by a conductor 40 ("positive" as shown) to the emitter 41 of a power transistor 42. Transistor 42 constitutes the final amplifier portion of the "switch and amplifier" 17; and transistor 42 includes, in addition to its emitter 41, a collector 43 and a base 44. The base 44 of transistor 42 is connected by a conductor 45 (and through a biasing resistor 46) to the negative output terminal of a full-wave rectifier 47. The rectifier 47 is located in the power supply means 33 for the switches and amplifiers 14–17 and has its input connected across a secondary coil 48, a suitable fuse 49 being placed across the output of rectifier 47. The emitter 41 of power transistor 42 is connected by a conductor 50 to one side of another secondary coil 51 within the power supply 33, and the opposite end of coil 51 is connected by a conductor 52 (and through a half-wave rectifier 53 and resistor 54) to the base 44 of the power transistor 42. The emitter 41 of transistor 42 is also coupled by a conductor 55 to the collector 56 of a transistor 57; transistor 57, in conjunction with another transistor 58, forms a two-stage multivibrator or "flip-flop," the purpose of which is to properly shape the control pulses or signals used to "trigger" the power transistor 42 and ultimately to switch the power supply means 13 to the respective stator coils 12a–12d for sequential energization of the latter. The respective bases of transistors 57 and 58 are connected to conductor 45 through suitable biasing resistors 59 and 60, respectively, while the emitter 61 of transistor 58 is connected by a conductor 62 to the positive output terminal of the full-wave rectifier 47. This completes the means for feeding or energizing the preferred circuitry utilized in the respective switch and amplifier 17, and the means for introducing the control voltages or gating signals into the switch and amplifier 17 will now be described.

With further reference to FIGURE 2, the emitter 61 of transistor 58 is connected by a conductor 63 to one side of the resistor 32 across which the control or gate signals are developed. The base 64 transistor 58 is connected by a conductor 65 (and through a resistor 66 and half-wave rectifier 67) to the opposite side of resistor 32. Resistor 32 is connected within the tuned circuit which includes the particular adjacent pair of stationary electrodes 19 and 20. This particular resonant tuned circuit will exhibit a maximum capacitive coupling effect between the rotating electrode 18 and the adjacent pair of stationary electrodes, 19, 20. These capacitive coupling effects develop gating signals which may be taken off of resistor 32 and fed—through multivibrator 57, 58 and final amplifier 42 of switch and amplifier 17—so as to control the sequential energization of the respective stator coils.

With reference to FIGURE 4, there is illustrated another embodiment wherein the switches and amplifiers 14–17 are connected to a pair of stator coils designated as 12a and 12a', 12b and 12b', 12c and 12c', and 12d and 12d', respectively. In this instance, current flows through the stator coils in one direction only, and the necessary flux changes are made with current flowing in a second coil. This arrangement may be suitable where more physical space is available.

In the present invention, as distinguished from the prior art, the brushless commutation is effected by means of a capacitive coupling or capacitive pick-up between the stator and the rotor, and the advantages of this method may be summarized as follows: The capacitive coupling is neither temperature-sensitive, nor does it suffer from magnetic "aging" effects. Moreover, the associated amplification circuitry is relatively simple, and successive amplification stages are not required. Furthermore, and under certain circumstances, the periodic resonance effects will generate sufficiently-sharp sinusoidal currents so as to simulate a "square wave" output and hence render special flip-flop circuits unnecessary. The overall physical "package" involves a minimum of required space and may be constructed easily and economically. Either series-wound, shunt-wound, or series-shunt motors, and even single or poly-phase induction motors, may be utilized within the teachings of the present invention; and moreover, small miniature motors, revolving at especially high-speeds, are particularly suited for the inverted construction. Also, the rotating electrode 18, being mechanically coupled to the rotor 11, shifts with speed, so that the static switching will have a time-shift in rotor position, and this too is an advantage for relatively high-speed motors.

Obviously, many modifications may be made without departing from the basic spirit of the present invention; and accordingly, within the scope of the appended claims, the invention may be practiced other than has been specifically described.

I claim:

1. In a rotating electrical machine having a rotor and a plurality of stator coils, the improvement in contactless commutation for energizing the stator coils, in sequence, from a source of current, which comprises:
   (a) a plurality of switching devices, at least one for each of the stator coils, connected between the stator coils and the source of current;
   (b) a high-frequency oscillator energizing a plurality of output coils corresponding in number to the stator coils;
   (c) said output coils being connected in series with each other and being polarized in relation to each other, whereby the respective voltages in two successive coils cancel one another;
   (d) a plurality of control elements, one for each of said output coils;
   (e) a plurality of stationary electrodes corresponding in number to the stator coils;
   (f) a rotating electrode coupled to the rotor and disposed in close physical proximity to said stationary electrodes;
   (g) means connecting each of two succeeding stationary electrodes in closed series circuit relationship with a respective one of said control elements and with a respective one of said output coils; and
   (h) means connecting each of said control elements to a respective one of said switching devices, whereby the capacitive coupling effect between said rotating electrode and said successive pairs of stationary electrodes triggers said switching devices and allows the respective stator coils to be energized, in sequence, from the source of current.

2. The improvement of claim 1, wherein:
   (a) said plurality of stationary electrodes comprises a plurality of co-planar stationary electrodes, circumferentially-spaced with respect to each other, and each being formed substantially as a quadrant of a circle; and wherein:
   (b) said rotating electrode comprises a member formed substantially as a segment of a circle, said member rotating in a plane parallel to the plane of said stationary electrodes.

3. The improvement of claim 1, wherein:
   (a) said switching devices comprise solid-state switching members, the number of which corresponds to the number of the stator coils; and wherein:
   (b) each of the stator coils comprises a pair of coils, whereby the current in the stator coils flows in one direction only.

4. In a rotating electrical machine having a rotor and a plurality of stator coils, the improvement in contactless commutation for energizing the stator coils, in sequence, from a source of current, which comprises:
   (a) semiconductor switching means connected between the stator coils and the source of current;
   (b) oscillator means including a plurality of output coils; said output coils being arranged so that the respective voltages in two successive coils cancel one another;
   (c) a plurality of quadrant-shaped spaced-apart substantially co-planar stationary electrodes arranged in substantially circumferential relationship with respect to each other;
   (d) a rotating electrode driven by the rotor and disposed in a plane parallel to the plane of said stationary electrodes and in close proximity thereto;
   (e) means forming a plurality of respective control circuits, one for each of said semiconductor switching means, with each control circuit being formed between a circumferentially adjacent pair of stationary electrodes and a respective one of said output coils of said oscillator means; and
   (f) means to derive successive gating signals from said respective control circuits, in accordance with the circumferential positioning of said rotating electrode, for controlling the sequential conduction of said respective semiconductor switching means from the source of current, thereby energizing the stator coils in sequence with one another.

References Cited by the Examiner

UNITED STATES PATENTS 2,980,839  4/61  Haeussermann _____ 318—138

ORIS L. RADER, *Primary Examiner.*